United States Patent
Behling et al.

(10) Patent No.: US 12,293,595 B2
(45) Date of Patent: May 6, 2025

(54) EXTRACTION OF EXTRACTION INFORMATION FROM SCANNING INFORMATION OF A SURFACE FOR USE WITH A DATABASE

(71) Applicant: Fraunhofer-Gesellschaft zur Förderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 117 days.

(21) Appl. No.: 18/311,444

(22) Filed: May 3, 2023

(65) Prior Publication Data

US 2023/0274564 A1 Aug. 31, 2023

Related U.S. Application Data

(63) Continuation of application No. PCT/EP2021/080787, filed on Nov. 5, 2021.

(30) Foreign Application Priority Data

Nov. 8, 2020 (DE) ..................... 10 2020 214 002.2

(51) Int. Cl.
*G06V 20/80* (2022.01)
*G05D 1/00* (2006.01)
(Continued)

(52) U.S. Cl.
CPC ........... *G06V 20/80* (2022.01); *G05D 1/0246* (2013.01); *G06V 10/771* (2022.01); *G06V 20/56* (2022.01)

(58) Field of Classification Search
CPC ...... G06V 20/80; G06V 20/56; G06V 10/771; G06V 10/46; G06T 2207/10028
See application file for complete search history.

(56) References Cited

U.S. PATENT DOCUMENTS

| 10,304,237 B2 | 5/2019 | Sequeira et al. |
| 2004/0167670 A1 | 8/2004 | Goncalves et al. |

(Continued)

FOREIGN PATENT DOCUMENTS

| DE | 10 2011 115 354 A1 | 4/2013 |
| DE | 10 2017 220 634 A1 | 5/2019 |

(Continued)

OTHER PUBLICATIONS

Japanese language office action dated Jun. 12, 2024, issued in application No. JP 2023-527223.

(Continued)

*Primary Examiner* — Carol W Chan
(74) *Attorney, Agent, or Firm* — McClure, Qualey & Rodack, LLP

(57) ABSTRACT

An apparatus having a processing unit configured to obtain scanning information, provided by a detection unit, from a scan of a surface, wherein the scanning information have information on an inherent feature of the surface. Furthermore, the processing unit is configured to extract extraction information for the inherent feature from the scanning information and to perform matching with a database based on the extraction information, wherein extraction information for a plurality of inherent features of the surface are stored in the database. Furthermore, the processing unit is (Continued)

configured to determine the position of the detection unit based on the matching.

23 Claims, 9 Drawing Sheets

(51) Int. Cl.
*G06V 10/771* (2022.01)
*G06V 20/56* (2022.01)

(56) References Cited

U.S. PATENT DOCUMENTS

| | | | |
|---|---|---|---|
| 2014/0005932 A1 | 1/2014 | Kozak et al. | |
| 2014/0121964 A1 | 5/2014 | Stanley et al. | |
| 2014/0350839 A1 | 11/2014 | Pack et al. | |
| 2016/0259034 A1 | 9/2016 | Imagawa | |
| 2020/0372672 A1* | 11/2020 | Schonberger | G06V 20/56 |
| 2022/0358665 A1* | 11/2022 | Chang | G05D 1/024 |
| 2023/0274564 A1 | 8/2023 | Behling et al. | |

FOREIGN PATENT DOCUMENTS

| | | | |
|---|---|---|---|
| EP | 0 937 284 B1 | 5/2002 | |
| EP | 3 482 622 A1 | 5/2019 | |
| JP | 2010-101807 A | 5/2010 | |
| JP | 2016-166853 A | 9/2016 | |
| NL | 2015420 B1 | 3/2017 | |
| WO | WO-2009142841 A2 * | 11/2009 | G06T 7/0042 |
| WO | 2022/096653 A1 | 5/2022 | |

OTHER PUBLICATIONS

English language translation of office action dated Jun. 12, 2024 (pp. 7-16 of attachment).
Suganuma, N.; "Evolving Autonomous Driving and Vehicle-Mounted Sensors;" No. 2, Nikkei Electronics No. 1192; pp. 82-86.
Fang, H., et al.; "Ground Texture Matching based Global Localization for Intelligent Vehicles in Urban Environment;" 2007 IEEE Intelligent Vehicles Symposium; Jun. 2007; pp. 105-110 https://ieeexplore.ieee.org/document/4290099.
Office Action dated Oct. 26, 2023, issued in application No. AU 2021375591.
International Search Report and Written Opinion issued in application No. PCT/EP2021/080787.
Wikipedia; "History of oriented gradients;" https://en.wikipedia.org/wiki/Histogram_of_oriented_gradients; pp. 1-7.
Wikipedia; "Point-set registration;" https://en.wikipedia.org/wiki/Point_set_registration; pp. 1-9.
Wikipedia; "Template Matching;" https://en.wikipedia.org/wiki/Template_matching; pp. 1-6.
Rubber Designs; "Gezolan EPDM Color Mixer;" https://www.rubberdesigns.com/color-mixer; 2022; pp. 1-4.
Rubber Designs; "EPDM Poured-in-Place Materials;" https://www.rubberdesigns.com/products/pour-in-place; 2022; pp. 1-9.
Kiefer USA; www.kieferusa.com; pp. 1-7.
Kiefer USA; www.kieferusa.com/by-brand/kiefer-usa/tuff-lock; pp. 1-3.
Rubber Designs; "High Quality, Sustainable Rubber Surfaces;" www.rubberdesigns.com; 2022; pp. 1-6.
Zhang, L., et al.; "High-Precision Localization Using Ground Texture;" 2019 International Conference on Robotics and Automation (ICRA), May 20, 2019 IEEE; May 2019; pp. 6381-6387.
Schmid, J.F., et al.; "Features for Ground Texture Based Localization—A Survey;" arxiv.org, Cornell University Library; Feb. 2020; pp. 1-13.

* cited by examiner

EXTRACTION OF EXTRACTION INFORMATION FROM SCANNING INFORMATION OF A SURFACE FOR USE WITH A DATABASE

CROSS-REFERENCE TO RELATED APPLICATIONS

This application is a continuation of copending International Application No. PCT/EP2021/080787, filed Nov. 5, 2021, which is incorporated herein by reference in its entirety, and additionally claims priority from German Application No. 10 2020 214 002.2, filed Nov. 8, 2020, which is also incorporated herein by reference in its entirety.

TECHNICAL FIELD

The present invention relates to apparatus and methods for determining the position of a detection unit based on matching extraction information with a database. In particular, the present invention relates to image-based localization on grounds with speckling. Furthermore, the invention relates to methods for storing extraction information in a database.

BACKGROUND OF THE INVENTION

Localization in free space represents an important basic building block for the operation of mobile robots. For the efficient and safe operation of mobile robots, for example in sorting systems, the robots should be able to reliably determine their own position. A potential challenge here is a changing environment, for example when positions of shelves or other obstacles change. In addition, there is an interest in operating robots at ever greater speeds, for example to complete sorting operations more quickly. Such general conditions place high demands on corresponding robots and respective localization processes.

Previous approaches to localizing robots vary widely. There are even some cases where the problem of localization is bypassed by intelligent tracking ("line-following"). A distinction can be made between external and internal localization. In the case of external localization, a system located outside the robot can be used, whereas in the case of internal localization, the sensor technology can be located on the robot itself.

One way of classifying existing internal localization methods can be based on the sensor technology used and its evaluation. Known methods include:

Radio-based localization methods: Here, the signal of one or more reference transmitters is used in various ways to establish a relative localization to the reference transmitter(s). If the absolute position of the transmitter is known, these methods can also be used for absolute positioning. Radio-based solutions work indoors and outdoors and differ, among other things, in the use of the modulation method, bandwidth, frequency, number of antennas used (keyword: MIMO), etc. One of the best-known representatives of radio-based localization methods is probably GPS, which, however, is of advantage or can only be used outdoors, for example.

Localization methods based on distance measurements: This refers to all methods which rely on different sensor technology with which distances can be measured. These include, among others, laser distance sensors, ultrasonic sensors, time-of-flight sensors, stereo or depth cameras. The sensors are usually used in such a way that distance information are not only available for a single measuring point, but for a plurality of (usually contiguous) points. For this purpose, depending on the type of sensor, more than one measurement can or must be made (example: laser scanner with rotating mirror), or more than one sensor must be used (example: ultrasonic sensor array). The measuring points can be understood to be a kind of height profile, which is compared to a kind of map, from which the information can be reconstructed, at which positions in space this height profile can be recorded. For example, so-called SLAM (Simultaneous Localization and Mapping) algorithms are often used, which combine the process of mapping and localization, enabling an agent to find its way in an unknown environment.

Camera-based or marker-based localization methods: Similar to the other two variations, here the position can be determined relative to known patterns in the environment, but based on RGB camera images and not on a height profile or depth image. On the one hand, there are methods which try to extract features from the images of the (unchanged) environment alone and to build a map from these (example: ORB-SLAM), on the other hand there is a plurality of methods which work by markers artificially inserted into the environment. Similar to the radio-based localization methods, the system itself knows the position of the markers in space and its own localization is performed relative to the observed markers. This can be done by triangulation (calculating the positions of several markers in the image relative to one another), by additional depth information (e.g. stereo vision or the additional use of TOF (time-of-flight) cameras), or by changing the marker position in the image over time. Markers, for example in the form of QR codes, can be applied to the ground, for example.

Other methods employ ground cameras, using a combination of optical flow and feature-based detection.

Furthermore, combinations of the methods described above can also be formed. In particular, it should be noted that methods, parts of methods or individual features from the known technology can also be used in combination with the inventive concept explained below.

The inventors have recognized that previous solutions for the localization of mobile robots have some disadvantages. For example, concepts which use tracking to bypass the problem of localization have difficulty in responding to a changing environment. Radio-based methods depend on sufficient signal strength so that shielding properties, for example of large metal surfaces of shelves or machines, must be taken into account in large industrial facilities. Furthermore, such localization may be highly dependent on the reference transmitter, whose failure can bring the entire system to a standstill. Systems based on distance measurement with mapping algorithms can have a high demand on computing power to record the map or to update it. Marker-based methods in turn rely on markers applied in advance, which can wear out, especially during operation, which may lead to errors.

Therefore, there is need for an improved localization concept.

SUMMARY

According to an embodiment, an apparatus may have: a processing unit configured to obtain scanning information, provided by a detection unit, from a scan of a surface, the scanning information having information on an inherent feature of the surface, wherein the inherent feature of the surface has a plurality of sub-features; and extract extraction information for the inherent feature from the scanning information, wherein the processing unit is configured to extract a set of sub-extraction information for each sub-feature of the plurality of sub-features and to determine a descriptor as part of the set of sub-extraction information for each sub-feature; and determine a value from each set of sub-extraction information, the value being associated to an information content of the sub-feature associated with the set of sub-extraction information; and compare each value to a threshold value; and select those sets of sub-extraction information for whose associated sub-feature the determined value at least reaches the threshold value; and perform matching with a database based on determined descriptors of the selected sets of sub-extraction information, wherein the database stores extraction information for a plurality of inherent features of the surface whose positions are known, and wherein the database stored descriptors for the plurality of sub-features; and determine the position of the detection unit based on the matching.

According to another embodiment, a system may have: an inventive apparatus as mentioned above; and the surface having the inherent feature, the apparatus being arranged to be movable with respect to the surface and configured to determine a position of the detection unit with respect to the surface; and the database.

According to another embodiment, a method for determining a position of a detection unit may have the steps of: obtaining scanning information from the detection unit, wherein the scanning information are a scan of a surface, and wherein the scanning information have information on an inherent feature of the surface, wherein the inherent feature of the surface has a plurality of sub-features; and extracting extraction information for the inherent feature from the scanning information; wherein extracting the extraction information further has, for each sub-feature of the plurality of sub-features, extracting a set of sub-extraction information and determining a descriptor for each sub-feature as part of the set of sub-extraction information; and determining a value from each set of sub-extraction information, the value being associated to an information content of the sub-feature associated with the set of sub-extraction information; and comparing each value to a threshold value; and selecting those sets of sub-extraction information whose associated sub-feature at least reaches the determined value of the threshold value; and performing matching, based on the determined descriptors of the selected sets of sub-extraction information, with a database, wherein the database stores descriptors for the plurality of sub-features of extraction information for a plurality of inherent features of the surface whose positions are known; and determining the position of the detection unit based on the matching.

According to another embodiment, a method for storing extraction information in a database for use with an inventive apparatus as mentioned above, may have the steps of: obtaining scanning information, wherein the scanning information are a scan of a surface, and wherein the scanning information have information on an inherent feature of the surface, wherein the inherent feature of the surface has a plurality of sub-features; and extracting extraction information for the inherent feature from the scanning information, wherein extracting the extraction information has, for each sub-feature of the plurality of sub-features, extracting a set of sub-extraction information and determining a descriptor for each sub-feature as part of the set of sub-extraction information; and determining a value from each set of sub-extraction information, wherein the value is associated with an information content of the sub-feature associated to the set of sub-extraction information; and comparing the value to a threshold value; and storing the extraction information for the inherent feature of the surface in the database, provided that the determined value of the inherent sub-feature at least reaches the threshold value.

Another embodiment may have a non-transitory digital storage medium having stored thereon a computer program for performing a method for determining a position of a detection unit, having the steps of: obtaining scanning information from the detection unit, wherein the scanning information are a scan of a surface, and wherein the scanning information have information on an inherent feature of the surface, wherein the inherent feature of the surface has a plurality of sub-features; and extracting extraction information for the inherent feature from the scanning information; wherein extracting the extraction information further has, for each sub-feature of the plurality of sub-features, extracting a set of sub-extraction information and determining a descriptor for each sub-feature as part of the set of sub-extraction information; and determining a value from each set of sub-extraction information, the value being associated to an information content of the sub-feature associated with the set of sub-extraction information; and comparing each value to a threshold value; and selecting those sets of sub-extraction information whose associated sub-feature at least reaches the determined value of the threshold value; and performing matching, based on the determined descriptors of the selected sets of sub-extraction information, with a database, wherein the database stores descriptors for the plurality of sub-features of extraction information for a plurality of inherent features of the surface whose positions are known; and determining the position of the detection unit based on the matching, when said computer program is run by a computer.

Still another embodiment may have a non-transitory digital storage medium having stored thereon a computer program for performing a method for storing extraction information in a database for use with an inventive apparatus as mentioned above, having the steps of: obtaining scanning information, wherein the scanning information are a scan of a surface, and wherein the scanning information have information on an inherent feature of the surface, wherein the inherent feature of the surface has a plurality of sub-features; and extracting extraction information for the inherent feature from the scanning information, wherein extracting the extraction information has, for each sub-feature of the plurality of sub-features, extracting a set of sub-extraction information and determining a descriptor for each sub-feature as part of the set of sub-extraction information; and determining a value from each set of sub-extraction information, wherein the value is associated with an information content of the sub-feature associated to the set of sub-extraction information; and comparing the value to a threshold value; and storing the extraction information for the inherent feature of the surface in the database, provided that the determined value of the inherent sub-feature at least reaches the threshold value, when said computer program is run by a computer.

The inventors have recognized that inherent features of a surface, in particular of grounds or floors on which vehicles are moved, can have a sufficiently large feature abundance in random distribution, which can be used for localization. Embodiments according to the present invention are based on the core idea of extracting extraction information for such inherent features of the environment in which, for example, navigation is to be performed, and matching with a database in which, in turn, extraction information for a plurality of inherent features of the environment are stored, in order to perform localization through the matching.

According to an embodiment of the present invention, an apparatus comprises a processing unit configured to obtain scanning information, provided by a detection unit, from a scan of a surface, wherein the scanning information comprise information on an inherent feature of the surface. Furthermore, the processing unit is configured to extract extraction information for the inherent feature from the scanning information and to perform matching with a database based on the extraction information, wherein extraction information for a plurality of inherent features of the surface are stored in the database. Furthermore, the processing unit is configured to determine the position of the detection unit based on the matching.

The detection unit may, for example, be an optical detection unit, for example a camera. The inherent features of the surface may, for example, in particular be features which describe a stochastically distributed property of the surface, i.e. which were not introduced into the surface deliberately or in an organized or predetermined manner, for example. In this context, an inherent feature can comprise, for example, a visually recognizable, distinguishable feature which varies across the surface and is advantageously distinguishable via locally limited variable individual features of the surface, such as the material which the surface has or serves as a carrier for it. For example, this may be a color speckle or other difference in contrast or a height profile of a surface. The formation of such features may occur randomly during the manufacturing process, in contrast to the use of markers, such as measurement marks or QR codes, which are not considered to be inherent features with respect to the present invention because they are applied specifically. Thus, an inventive concept enables, for example, a simple use of predominant characteristics of the environment without having to introduce coded information. Furthermore, by determining the position by means of matching with a database, determining an absolute position, for example with respect to the position in space, is possible without additional matching with a reference position or known own start information, as, for example, in integrating methods measuring velocities or accelerations. However, it should be noted that inventive concepts can also be extended by such further localization methods or partial methods.

According to an embodiment of the present invention, a system comprises one or more of the apparatus explained previously and also below, the surface having the inherent feature, the apparatus being arranged to be movable with respect to the surface and configured to determine a position of the detection unit with respect to the surface, and the database.

In particular, the apparatus can have the detection unit so that the apparatus, for example implemented as a mobile robot, can determine its own position by determining the position of the detection unit. The inventive overall system can be used, for example, as part of a sorting system, where the surface is, for example, the ground surface on which mobile robots move. Due to the fast and robust localization according to the disclosure, a higher efficiency of such an overall system is possible than with previous solutions, for example.

According to an embodiment of the present invention, a method for determining a position of a detection unit comprises obtaining scanning information from the detection unit, wherein the scanning information are a scan of a surface, and wherein the scanning information comprise information on an inherent feature of the surface. Further, the method comprises extracting extraction information for the inherent feature from the scanning information, performing matching with a database based on the extraction information, wherein the database stores extraction information for a plurality of inherent features of the surface, and determining the position of the scanning unit based on the matching. Such a method enables fast and robust localization of the detection unit and, for example, in particular localization without a priori information on its own position.

According to an embodiment of the present invention, a method for storing extraction information in a database for use with an inventive apparatus comprises obtaining scanning information, wherein the scanning information are a scan of a surface, and wherein the scanning information comprise information on an inherent feature of the surface. The method further comprises extracting extraction information for the inherent feature from the scanning information, and storing the extraction information for the inherent feature of the surface in the database.

By storing the extraction information in the database, inventive localization of the detection unit can be made possible. Due to the analog processing of the information, e.g. with regard to the extraction, an optional use of threshold values for the information content, an optional determination of descriptors as well as the evaluation of the extraction information, for example in case of the use of mobile robots, by one or more robots whose positions are exactly known, e.g. by additional systems, a mapping of the environment, e.g. the surface of the ground, can be performed.

According to an embodiment of the present invention, a computer program comprises program code for performing an inventive method when the program runs on a computer.

According to an embodiment of the present invention, the apparatus comprises the detection unit configured to provide the scanning information.

The integration of the detection unit into the apparatus, which is implemented as a mobile robot, for example, enables localization of the apparatus. Furthermore, a defined arrangement of the detection unit on the apparatus can be used for manipulation, for example improving the scanning information, e.g. for optical rectification of the scanning information when knowing the position of the apparatus with respect to the surface.

According to an embodiment of the present invention, the processing unit is configured to determine, based on the matching with the database, the position of the detection unit in space with respect to the inherent feature of the surface.

By determining the position, for example the orientation, of the detection unit and thus, for example, also of the apparatus, higher-level trajectory planning, for example with collision avoidance and calculation of possible speeds, can be made possible.

According to an embodiment of the present invention, the processing unit is configured to extract the extraction information for the inherent feature from the scanning information, taking into account optical properties of the scanning unit.

Taking into account optical properties of the detection unit, for example the camera, can contribute to improve the quality of the extraction information. Optical properties may include, for example, focal lengths, aperture angles, or other parameters, such as the lens used. Furthermore, the position and orientation of the detection unit with respect to the apparatus, in case the apparatus comprises the detection unit, can also be taken into account.

According to an embodiment of the present invention, the processing unit is configured to select a selected part of extraction information of the database based on coarse information on the position of the detection unit in space, at the time of detecting the scanning information, and to use the selected part for matching.

The coarse information may be, for example, the last determined position of the detection unit or apparatus. By such known information, which forms a priori information for the current processing step, for example, a region of the database can be selected which is eligible for matching, in other words, which contains extraction information of inherent features which can be reached with respect to last position of the detection unit by the detection unit in this processing step. This may reduce the computational effort and/or improve accuracy of the position information.

According to an embodiment of the present invention, the processing unit is configured to determine from the scanning information a descriptor as part of the extraction information based on the inherent feature of the surface and to perform matching with the database based on the descriptor, wherein descriptors for the plurality of inherent features of the surface are stored in the database.

The descriptors can be a mathematical description of an inherent feature or a part of an inherent feature, e.g. a sub-feature. For example, in the case of color speckles on a ground surface, descriptors can be calculated which describe the shape of the color speckles. For example, Hu moments can be used for this purpose. Descriptors enable classification of the inherent feature, and thus enable better matching with the database, since the descriptor enables, for example, a more precise description of the inherent feature and thus, for example, a more reliable association to stored features. Furthermore, a rotationally variant descriptor can be used, for example, to determine a position of the inherent feature with respect to the detection unit and thus the position of the detection unit itself.

According to an embodiment of the present invention, the processing unit is configured to determine a rotation-invariant descriptor as part of the extraction information which is based on the inherent feature of the surface.

Rotation-invariant descriptors can be determined with little computational effort, for example as a by-product of image segmentation, e.g. in the course of extracting extraction information. This in turn can enable classification or description of the inherent feature, which can improve position determination by more accurate matching with the database.

According to an embodiment of the present invention, the processing unit is configured to determine descriptors having Hu moments and/or ORB features.

Hu moments and/or ORB features (ORB=Oriented Fast and Rotated BRIEF, technical term) form examples of descriptors which can be determined with little computational effort, making them suitable for use in mobile robots.

According to an embodiment of the present invention, the inherent feature of the surface is a stochastically distributed feature with stochastic properties.

The stochastically distributed feature may be, for example, a pattern of a ground on which mobile robots travel, with different sizes, shapes, colors, or textures. Furthermore, it can also be the height profile of the surface of the ground. By being able to perform localization based on such features, an inventive concept can be used in a variety of environments or applications, without any special preparation such as setting up radio beacons or attaching coded information, for example in the form of QR codes.

According to an embodiment of the present invention, the information are a description of a random geometry of the stochastically distributed feature.

By detecting a random geometry of the stochastically distributed feature by the detection unit, for example, the location of the detection unit can be determined in addition to position by describing the shape of the geometry and associating or matching it with the database. Furthermore, database matching of the random geometry enables, for example, a particularly robust classification of the inherent feature and thus robust position determination.

According to an embodiment of the present invention, the stochastically distributed feature has a contiguous area with random surface area and random external shape, and the processing unit is configured to extract the extraction information comprising information on the contiguous area with random surface area and random external shape.

Contiguous areas of random surface area of random external shape can be found in a variety of industrially used ground surfaces, for example in the form of color speckles or other patterns so that an inventive method can be used by extracting extraction information in a variety of existing plants, for example without structural changes.

According to an embodiment of the present invention, the processing unit comprises a stochastic filter and the processing unit is configured to perform filtering of the determined position of the detection unit by means of the stochastic filter to determine a filtered position of the detection unit.

By using stochastic filters, for example, determining the position of the detection unit can be further improved, in particular using a known start position or position of the detection unit in a previous processing step, for example the coarse information. Furthermore, additional information, for example from acceleration or position sensors, can also be used via filters such as Kalman filters, for improved or redundant position determination, for example.

According to an embodiment of the present invention, the inherent feature of the surface comprises a plurality of sub-features and the processing unit is configured to extract a set of sub-extraction information for each sub-feature of the plurality of sub-features and to determine a value from each set of sub-extraction information, the value being associated with an information content of the sub-feature associated with the set of sub-extraction information. Further, the processing unit is configured to compare each value with a threshold value and to select those sets of sub-extraction information for whose associated sub-feature the determined value at least reaches the threshold value and to perform matching with the database based on the selected sets of sub-extraction information.

Sub-features can be, for example, individual elevation ranges or patterns of the surface, such as ground surface. For each sub-feature, in turn, a plurality of sub-extraction information can be extracted which enable a description of the sub-feature with respect to matching with the database. In the case of color speckling of a ground, the sub-feature may be a single color speckle and the sets of sub-extraction information may be information on the position, color, shape, and other characteristics of a color speckle. In this regard, the inherent feature described above may particularly include the plurality of sub-features. Specifically, for example, the color speckling of the ground surface as a whole can form the inherent feature, with each individual color speckle forming a sub-feature. It is to be noted, however, that the inherent feature can also be formed by only a sub-aspect of the scanning information, such as a single color speckle. Due to the differentiated evaluation of the scanning information of the environment or the surface, a variety of information are available for matching with the database, which can lead, for example, to a more precise determination of the position of the detection unit. The threshold value comparison enables the reduction of the computational effort, since, for example, only such sub-extraction information of sub-features are used for the matching with the database, which have a high information content, so that the risk of ambiguities can be reduced. Furthermore, the computation can be focused on candidates for which good, distinguishable results are expected, which enables low computational effort.

According to an embodiment of the present invention, the processing unit is configured to determine a descriptor for each sub-feature of the plurality of sub-features as part of the set of sub-extraction information and to perform matching with the database based on the determined descriptors, wherein descriptors for the plurality of sub-features are stored in the database.

In analogy to determining descriptors for the inherent feature, a descriptor can also be determined for each sub-feature, which in turn can be used to classify or describe the sub-feature in order to improve the position determination by matching with the database.

According to an embodiment of the present invention, the processing unit is configured to select the sets of sub-extraction information based on the probability of occurrence of the associated sub-features.

By selecting sets of sub-extraction information whose corresponding sub-feature has a low probability of occurrence, the computational effort can be low because only a small number of sub-extraction information are matched with the database. In addition, due to the lower occurrence probability, corresponding sub-features can be more unambiguously associated to a position of the detection unit, which can make determining the position accurate and/or robust.

According to an embodiment of the present invention, the processing unit is configured to determine from each set of sub-extraction information a probability of occurrence of the associated sub-feature as a value for the information content.

By using the probability of occurrence to determine the information content, according to the invention, a simple and well interpretable possibility, for example, is provided to perform the selection of the sets of sub-extraction information.

According to an embodiment of the present invention, the processing unit is configured to determine a point cloud from the selected sets of sub-extraction information and to perform matching with the database based on a point cloud matching method or algorithm.

Using the sets of sub-extraction information and the positions of the sub-features, which may be part of the sub-extraction information, an associated point cloud can be determined and used for matching with the database. A plurality of possible implementations of point-cloud matching algorithms can be used, allowing a good compromise between computation speed, computational effort, and accuracy depending on the available computational power and architecture, for example, computing the position of a mobile robot by the robot itself or a central computational unit.

According to an embodiment of the present invention, the processing unit is configured to perform the database matching based on at least one of Iterative-Closest-Point, Kernel-Correlation and RANSAC (random sample consensus).

Corresponding methods can be used in mobile processing units with little computational effort. Furthermore, they enable sufficiently accurate matching with the database, which can enable the navigation of autonomous robots.

According to an embodiment of the present invention, the processing unit is configured to obtain the scanning information as an image from a camera as a detection unit, wherein the image is a scan of a ground surface, and wherein the image includes information on an image background and an image foreground, the image foreground including information on a plurality of color speckles of the ground. Furthermore, the processing unit is configured to extract the information on the image foreground from the image and to extract, for each color speckle of the plurality of color speckles, a set of sub-extraction information from the extracted information of the image foreground, the set of sub-extraction information comprising information on a position and at least one of a shape, a color, and an area parameter of the associated color speckle.

Furthermore, the processing unit is configured, for example, to determine a value from each set of sub-extraction information, the value being associated with the probability of occurrence of the color speck associated with the set of sub-extraction information, and to compare each value with a threshold value and to select those sets of sub-extraction information for whose associated color speckle the determined value at least reaches the threshold value. Furthermore, the processing unit of the embodiment is configured to determine a point cloud from the selected sets of sub-extraction information comprising information on the positions of the associated color speckles and to perform matching with the database based on the point cloud and the selected sets of sub-extraction information, wherein a pre-determined point cloud of positions of color speckles of the ground surface and corresponding sets of sub-extraction information are stored in the database. In addition, the processing unit is configured to determine the position of the camera based on the matching.

The information on the position of the color speckle can be information on the position in a reference system of the detection unit. Furthermore, the use of an RGB camera allows an e.g. easy extraction of sub-extraction information which contain information on the color of an associated color speckle. In addition, descriptors can be computed, for example, for further classification of the color speckles, for example with respect to their shape, and matching with the database can be performed with respect to a plurality of descriptors stored in the database. The concept enables robust and accurate localization of the camera position on a ground surface.

According to an embodiment of the present invention, the apparatus is an automatically and/or autonomously driving vehicle and the processing unit is configured to locate the automatically driving vehicle.

When the apparatus is implemented as an automatically driving vehicle, the vehicle can be localized in particular by integrating the detection unit, which can be mounted in a defined position and location on the vehicle, by determining the position of the detection unit. For safe and efficient use of the automatically driving vehicle, the inventive implementation of the vehicle enables robust and fast localization.

According to an embodiment of the present invention, the apparatus is a robotic vehicle, like for a sorting system.

A sorting system in accordance with embodiments may have a plurality of robotic vehicles, which should advantageously be able to determine their own position for efficient and safe operation. Localization according to the invention can, for example, reduce safety distances to speed up the sorting process.

According to an embodiment of the present invention, a method for storing extraction information in a database comprises determining a value associated with an information content of the inherent feature, and comparing the value with a threshold value, and storing the extraction information for the inherent feature of the surface in the database if the determined value of the inherent feature at least reaches the threshold value.

By selecting extraction information with respect to the information content of the associated inherent feature, both the size of the database and the computational effort for matching with the database can be improved while, for example, improving the quality of the position determination due to the avoidance of disagreement, at the same time.

BRIEF DESCRIPTION OF THE DRAWINGS

Examples according to the present disclosure will be explained in more detail below with reference to the accompanying figures. With respect to the schematic figures shown, it is pointed out that the functional blocks shown are to be understood to be both elements or features of the apparatus according to the disclosure and corresponding method steps of the method according to the disclosure, and corresponding method steps of the method according to the disclosure can also be derived therefrom. In the drawings.

DETAILED DESCRIPTION OF THE INVENTION

Before embodiments of the present invention will be explained in detail below with reference to the drawings, it is pointed out that identical elements, objects and/or structures or those of the same function or effect are provided with same or similar reference signs in the different figures so that the description of these elements shown in different embodiments is interchangeable or mutually applicable.

Embodiments described below are described in the context of a plurality of details. However, embodiments may be implemented without these detailed features. Furthermore, for the sake of clarity, embodiments are described using block diagrams as a substitute for a detailed representation. Furthermore, details and/or features of individual embodiments can easily be combined with one another, as long as it is not explicitly described to the contrary.

Figure 1:
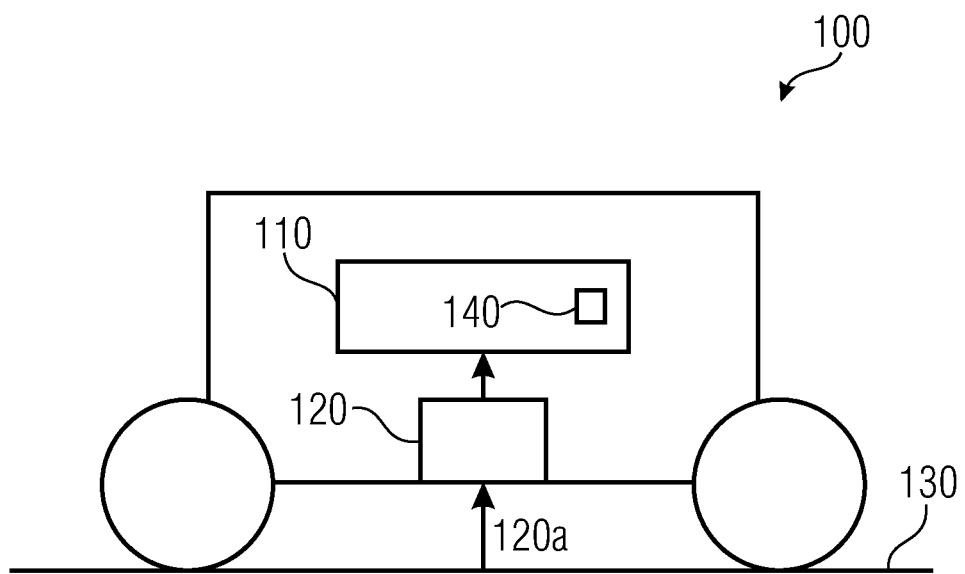
FIG. 1 shows a schematic side view of an apparatus according to an embodiment of the present invention.

FIG. 1 shows a schematic side view of an apparatus according to an embodiment of the present invention. FIG. 1 shows an apparatus 100 with a processing unit 110. The processing unit 110 may comprise a microcontroller but also a processor (central processing unit CPU) and/or a graphical processor unit (GPU).

The apparatus 100 optionally comprises a detection unit 120. The detection unit comprises, for example, a camera such as an area scan camera or a line scan camera, but may also be implemented for other, advantageously optical, scanning of the surface, for example by means of RADAR (Radio Detecting and Ranging) or LiDAR (Light Detecting and Ranging). The processing unit 110 is configured to obtain, scanning information provided by the detection unit 120 from scanning 120a a surface 130, the scanning information comprising information on an inherent feature of the surface. In the event that the detection unit 120 is not part of the apparatus, this information can still be obtained from such a device by the processing unit 110, such as by optical or radio-based data transmission, by a wired medium, and/or by a storage medium, enabling localization afterwards, for example.

The processing unit 110 is configured to extract extraction information for the inherent feature from the scanning information and to perform matching with a database based on the extraction information, wherein the database stores extraction information for a plurality of inherent features of the surface. Additionally, the processing unit 110 includes an optional stochastic filter 140.

An inherent feature can be understood, for example, to be a feature recognizable by means of the scanning technique used, e.g. an optically recognizable, distinguishable feature which varies over the surface and is advantageously distinguishable by means of locally limited variable individual features of the surface, for example as a property of the material which the surface has or at least serves as a carrier for it. For example, an optically recognizable feature may be part of the carrier if it is still painted and the paint physically forms the surface but leaves the feature recognizable. Such a distinction is not essential for embodiments so that such an e.g. painted carrier is still understood as a surface. For example, the feature is a color speckle or other contrast difference and/or a height profile.

Furthermore, the processing unit 100 is configured to determine the position of the detection unit based on the matching. The apparatus may, for example, be a vehicle such as a mobile robot as indicated in FIG. 1. An implementation as a drone, automobile, or other, for example, movable object, which is to enable localization, is also possible.

Unlike known methods, embodiments allow localization of the detection unit to be performed based on features inherent to the surface, such as the ground, for example by evaluating the optical flow to provide absolute localization.

The processing unit 110 may be further configured to determine the location of the detection unit in space with respect to the inherent feature of the surface 130. For example, based on a known, defined position of the detection unit 120 with respect to the ground surface and recognizing a location of the inherent feature with respect to the detection unit, e.g. via database matching with rotation-variant descriptors and/or point-cloud matching. For further improvement, in particular properties of the detection unit, such as optical properties of the detection unit 120, for example the camera, can be taken into account, to prepare the scanning information for evaluation or information extraction, for example.

The processing unit can be configured, for example, to match a recognized inherent feature, possibly as a result of preprocessing, which will be discussed later, with the database, wherein the database contains, for example, the feature and an assigned position so that, based on the matching, the assigned position can be obtained as a result of the matching and localization is thus based on the inherent feature. Compared to QR codes, for example, this can mean a considerable reduction in effort since such codes do not have to be applied to the surface first. In addition to the position, rotation of the detection unit can also be obtained from the comparison, for example by storing corresponding reference information for the stored feature in the database.

To reduce computing time, the processing unit 110 may further take into account coarse information on the position of the detection unit, for example the last determined position, in order to use only a selected part of the database for the matching. Alternatively or additionally, further information may be used, such as knowledge that the vehicle is located in a particular section or sector of the overall system so that, for example, only those database entries are used for comparison for which a match is possible or likely in view of the preliminary information.

For example, the processing unit 110 may determine a descriptor as part of the extraction information which is based on the inherent feature of the surface to perform matching with the database based on the descriptor. Such a descriptor, i.e. a descriptive identifier, may be rotation-variant, but is advantageously rotation-invariant. Rotation-invariant descriptors can have the advantage that they can still be reliably recognized or assigned, e.g. with high reliability and/or accuracy, under rotation, e.g. a rotation of the feature associated with the descriptor with respect to a descriptor, stored in the database, of the same but rotated feature, e.g. during the matching with the database. This means that even if a localization is made at a different rotation angle to a feature or sub-feature, the feature can still be recognized reliably based on the descriptor. When using rotation-invariant descriptors, a point-cloud matching algorithm can be used according to the invention to determine the rotation or to fine-determine the location of the detection unit. Furthermore, the processing unit 110 can also be configured to determine information on a rotation of the inherent feature based on histograms of oriented gradients (HOG) and thus, in conclusion, to determine information on a rotation or location of the detection unit based on a known position and location of the detection unit with respect to the scanning information, for example.

The optional stochastic filter 140 may be used to filter the determined position of the detection unit to determine a filtered position of the detection unit, for example to improve position determination.

Figure 2A:
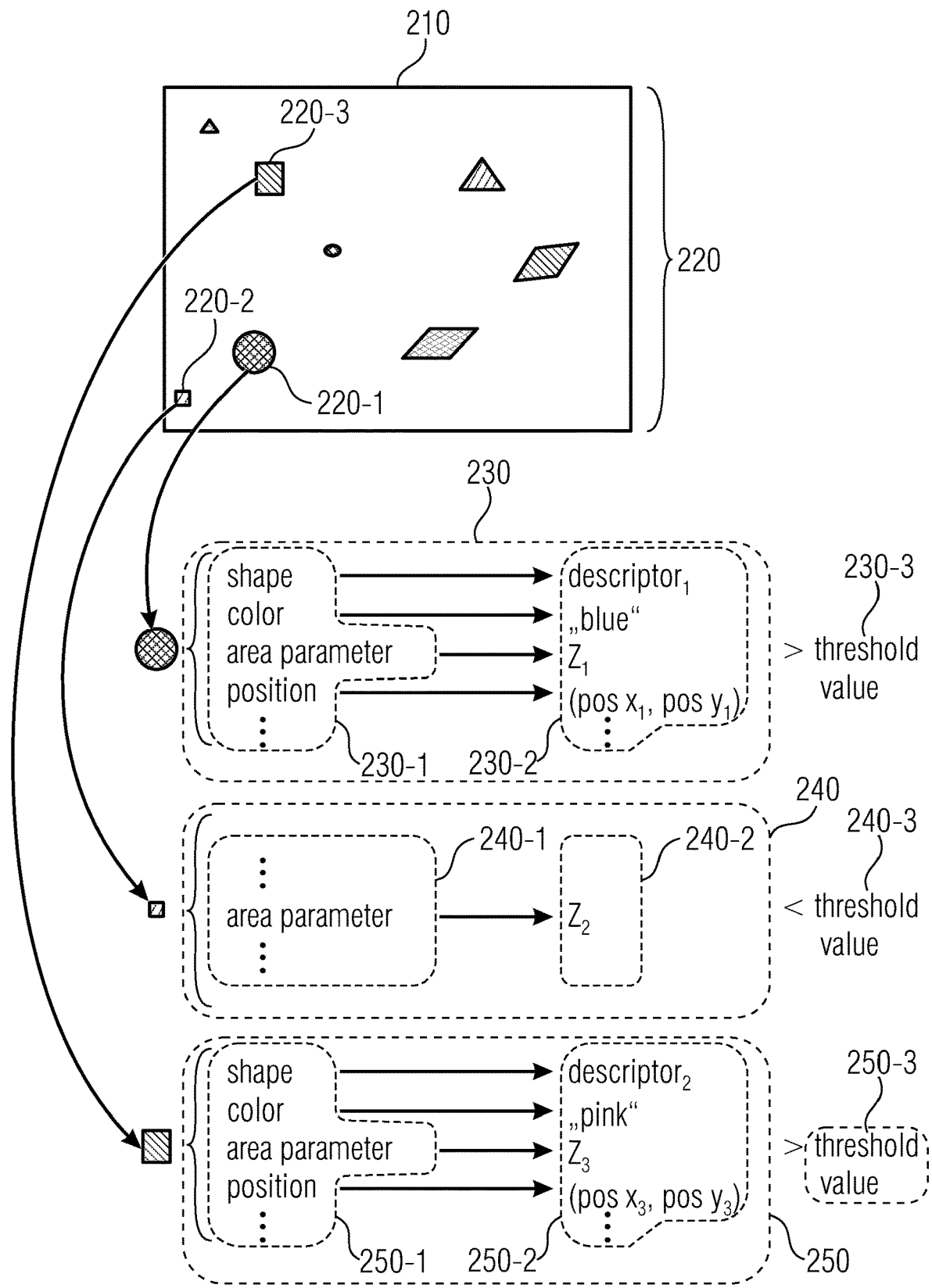
FIG. 2a shows an example of scanning information from a scan of the surface and extracting information according to an embodiment of the present invention.

FIG. 2a shows an exemplary schematic diagram illustrating a possible processing of scanning information which originates from scanning the surface, for example, and can be used for extracting information according to an embodiment of the present invention. FIG. 2a shows scanning information 210 of a floor surface with exemplary color speckles, i.e. color differences in the surface, as is known, for example, from recycled rubber floors which can be used, for example, as a base layer for washing machines.

thus, the inherent feature 220 forms, for example, the entirety of the color speckles on the surface and associated extraction information forms the entirety of information extracted therefrom, for example comprising global or relative arrangement, shape, color, area and/or position of all color speckles or a part thereof on which the scanning information 210 has information.

In the case shown, the inherent feature 220 has a plurality of sub-features 220-1, 220-2, 220-3 (and others), such as in the form of the individual color speckles. It should be noted that the complement, such as a single-color background, may have comparable information, at least in part, such as with respect to the shape, the global or relative arrangement of the speckles, and/or an area of the speckles which can be viewed as a section of the background by means of separation. For each color speckle, a respective set of sub-extraction information 230, 240, 250 may be extracted. As an example, extraction for three sub-features 220-1, 220-2, 220-3 is shown.

For sub-feature 220-1, the set of sub-extraction information 230 is extracted, for sub-feature 220-2, the set of sub-extraction information 240 is extracted, for sub-feature 220-3, the set of sub-extraction information 250 is extracted.

The sub-extraction information in turn may each have at least information 230-1, 240-1, 250-1 on a set comprising shape, color, an area parameter, and the position of the associated sub-feature, wherein the contents of the enumeration, the order, and the number of different categories are to be understood as merely exemplary and do not necessarily limit the embodiments. This information may be stored in various formats 230-2, 240-2, 250-2. For example, this information may have descriptors describing the information on the shape. For example, the information on the color may be described using an RGB value or discrete textual information, such as "blue". For example, an area parameter describing the area content may form a single scalar, such as $z_1$. The position in turn may be determined as a tuple of coordinates, e.g. (pos $x_1$, pos $y_1$).

A value can be determined from the extraction information, which is associated with an information content to the set of sub-extraction information related sub-feature. According to FIG. 2a, this can be an area parameter, for example. For example, it can be assumed that large color speckles occur less frequently than small color speckles or vice versa or that one color or shape is represented more frequently than another. Threshold comparison 230-3, 240-3, 250-3 can reduce the computational effort entailed to subsequently match the database by increasing the information content of the individual selected sub-extraction information. For example, sub-feature 220-2 is not considered because its associated area parameter $z_2$ does not satisfy the associated threshold 240-3. This can also be expressed in such a way that very probable, i.e. information-poor sub-features can be excluded or filtered out by means of the threshold value decision.

Figure 2B:
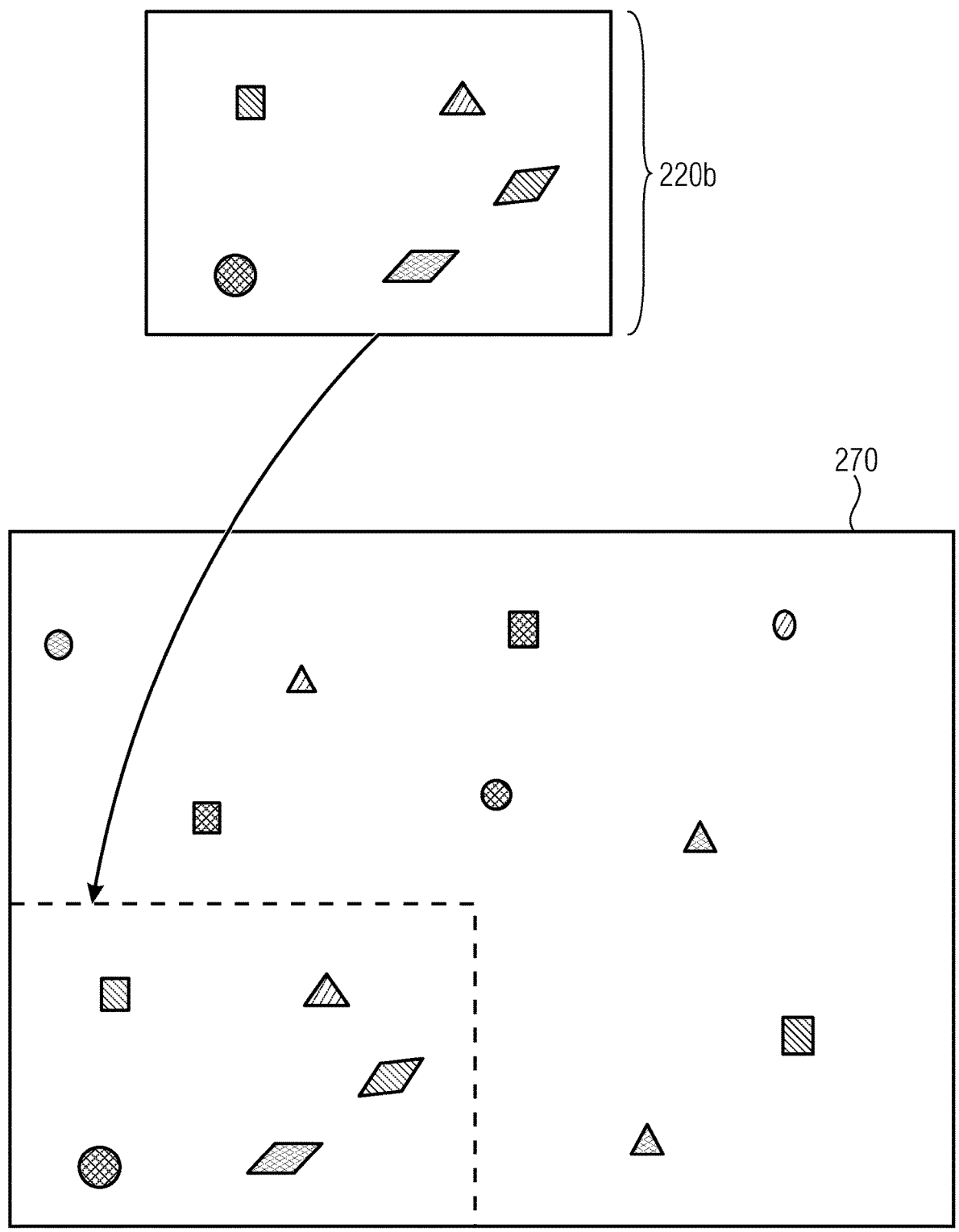
FIG. 2b shows an example of matching with the database according to an embodiment of the present invention.

FIG. 2b shows an example of matching with the database according to an embodiment of the present invention. FIG. 2b shows a representation of the sub-features of the scanning information 210 of FIG. 2a with sub-features whose associated sub-extraction information satisfies the threshold value, in block 220b. The database 270 includes extraction information or sub-extraction information for a plurality of inherent features of the surface or inherent sub-features of the surface. Associated (not shown) sub-extraction information are assigned to each of the shown sub-features in the database 270. By matching, for example, with respect to the arrangement and respective information of the sub-extraction information, the sub-features 220b may be associated with information in the database 270 to determine a detection unit position.

In embodiments, determining the position of the detection unit by means of matching with the database may comprise several steps. For example, in a first step, a set of possible positions of the sub-features may be obtained by matching the associated sub-extraction information of the sub-features with the sub-extraction information of the database. Possible positions of the sub-features (e.g. blobs) in the reference field, e.g. the entire mapped surface, e.g. ground surface, can be determined by this.

In a further step, a point-cloud matching algorithm can subsequently be used to counteract ambiguities in determining the position or, in other words, to determine the true or at least a probable position of the sub-features from the set of possible positions.

Additional information can also be taken into account, such as the positions of the sub-features relative to one another. For example, the five shapes of FIG. 2b may appear in a different, similar arrangement in the spatial database because, for example, similar sub-features were mapped at other locations. In this case, it may not be sufficient to know which sub-extraction information are present in the image. Therefore, it may be advantageous or necessary to consider the arrangement of the elements, e.g. color speckles or blobs, relative to one another. This information can be processed by the point cloud matching algorithm, e.g. to enable unambiguous assignment.

In further embodiments according to the present inventions, the further step may be omitted. In embodiments, descriptors can be determined which are so unambiguous that, for example, the mere look-up into the database is sufficient for determining the position of the sub-features and thus the position of the detection unit.

Figure 3:
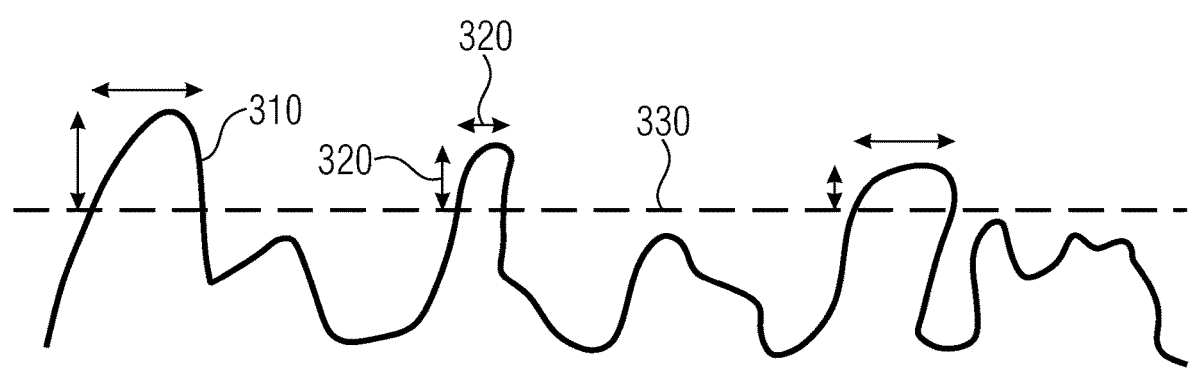
FIG. 3 shows further scanning information according to an embodiment of the present invention.

FIG. 3 shows further scanning information according to an embodiment of the present invention. FIG. 3 shows a height profile of scanning information of a surface, for example a ground surface, wherein sub-features 310 of the ground surface are, for example, individual elevations and/or depressions of the ground, and wherein sub-extraction information have height or width information 320 of the elevations. Understood as an island structure, an area and/or a shape and also a height can also be used here as an alternative or in addition to a color.

A threshold value for selecting sub-extraction information is formed, for example, by a minimum height 330, wherein the example can also be inverted in the depth direction. Accordingly, embodiments according to the present invention are not limited to image information and/or grounds. Furthermore, environmental features are also usable, for example, located on a ceiling or wall of the environment. For example, for the formation of drones according to the present invention, a plurality of extraction information of inherent features of the surfaces of the environment is extractable in three-dimensional space.

A further embodiment according to the present disclosure will be described below in more detail with reference to FIGS. 4, 5 and 6.

Figure 4:
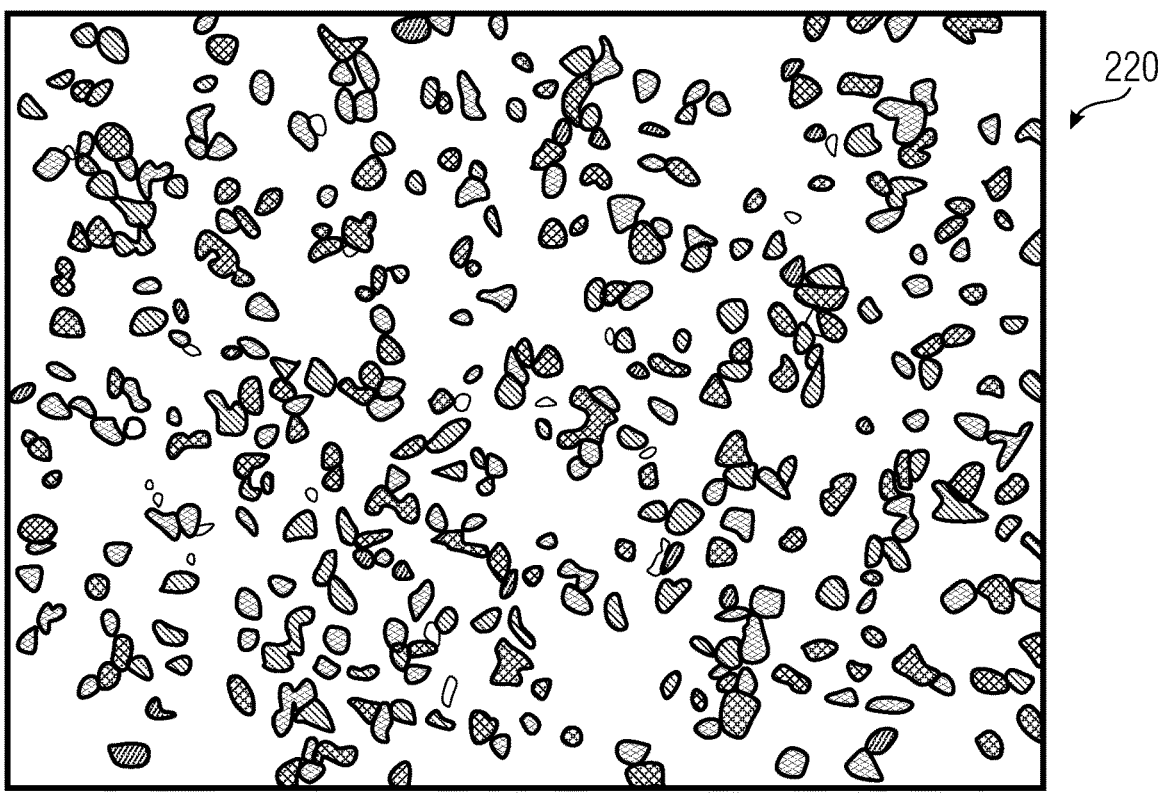
FIG. 4 shows a photograph of a piece of rubber floor with speckling, which is suitable for embodiments described herein.

For this purpose, FIG. 4 shows a photograph or image of a piece of a rubber floor mentioned above with color speckles which can, for example, represent the inherent feature 220 at least in parts.

An aspect of this embodiment forms a detection unit in the form of a camera which is directed to the surface in the form of the ground or the ground surface and, for localization, attempts or is formed together with the processing unit to extract special features from the recorded piece of ground or the scanning information which has information on the special and/or inherent features, and to compare it with a database of features whose position is known. In other words, extraction information are extracted by the camera from information on an inherent feature, for example, the special features, to be compared with the database, wherein extraction information for a plurality of inherent features of the surface are stored in the database.

Unlike marker-based systems, this does not involve specially applied features—such as a QR code—on the ground, nor a SLAM ("Simultaneous Localization and Mapping") process which independently extracts features from the camera image and maps them—as is the case, for example, with the ORB-SLAM (ORB=Oriented Fast and Rotated BRIEF, technical term).

For a better understanding of the inventive concept, an example of a floor surface will be discussed in more detail below, e.g. separately from the algorithm. A standard process for the production of rubber floors such as those shown in FIG. 4 uses recycled material (e.g. EPDM—ethylene propylene diene (monomer) granules), which is added to the base compound in the form of small colored "flakes". The base compound mixed with the plastic granules is then either extruded and/or rolled. The result of this process is, for example, rubber mats (either cut to size or rolled up), which have a speckled pattern. The exact appearance of the pattern depends on the type and amount of granules added, but the resulting "speckling" is, for example, always completely random, see FIG. 4. The speckles are thus inherent to the floor and at the same time, due to their randomness, form a source of information for localization. It should be noted that an inventive method is not limited to a class of rubber floors according to a specific manufacturing process; a variety of floors which are e.g. similar to those described herein or a different randomness of inherent features can be used, for example.

One idea of the method according to this embodiment example is to make this random speckle pattern, which is automatically created during the manufacturing process, usable for localization. For this purpose, embodiments provide for executing the process of image processing described below, at least in parts in advance on the entire ground surface, or the entire ground to be made usable for localization, in order to obtain a reference database, e.g. for spring in the database, since this is not necessarily a SLAM process. The overall processing pipeline may consist of or include the following elements, which may be executed sequentially:

A first step after capturing the image, which is not necessarily the first to be performed, may include segmentation, the purpose of which is to separate contiguous color segments from the image. These contiguous colored areas may be referred to as "(color) blobs" or color dabs, see, for example, the explanations of inherent features 220-1, 220-2 and 220-3 in FIG. 2a and FIG. 2b. In other words, for example, in the first step for extracting the extraction information or sub-extraction information, the image may be segmented to extract extraction information on the color of the individual color blobs, for example. In other words, the segmentation forms an example of extraction of extraction information or extraction of sub-extraction information, for example for a sub-feature of a single color blob.

A system in accordance with embodiments described herein comprises an apparatus described herein and the surface having the inherent feature; wherein the apparatus is arranged to be movable with respect to the surface and configured to determine a position of the detection unit with respect to the surface. Furthermore, the system comprises the database.

Figure 5:
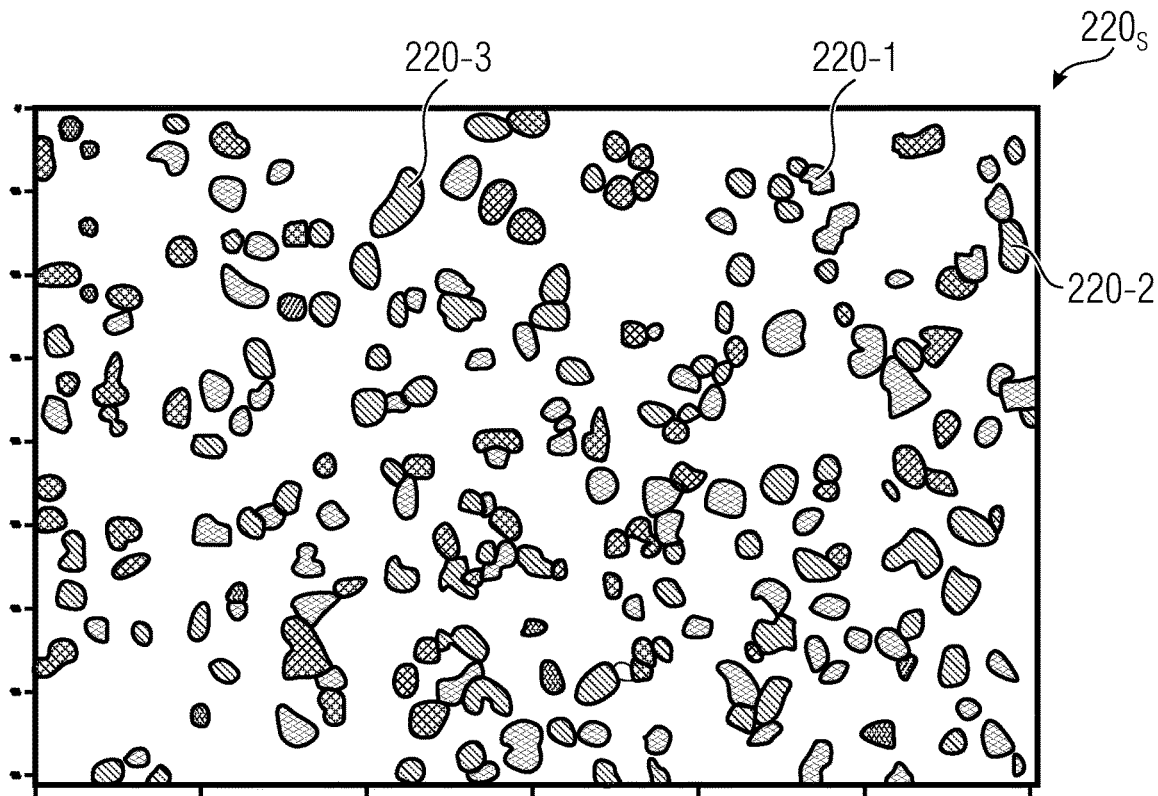
FIG. 5 shows an exemplary representation of a segmentation of color speckles, in the form of the colored "blobs" in an image of the rubber floor from FIG. 4, according to an embodiment.

The result of such a segmentation can be seen in FIG. 5. In this respect, FIG. 5 shows a segmentation of color speckles, in the form of the colored "blobs" in the image.

Depending on the type of ground used, a different number of different segmentation levels can be used here. In the example of FIG. 4 and FIG. 5, the ground consists of four different colors—red, green, blue, black—with the dominant color (black) representing the background. The result of the segmentation in this example are three binary images, which separate contiguous areas of the same color ("blobs") from the rest. Although it is possible to perform an evaluation in only a subset space of this, for example using only one color or two colors, it offers the advantages to use all sources of information.

In order to make the whole thing more usable for further processing or to make it less computationally complicated, a part of the information present in the image is discarded, for example. The ground shown has, for example, 30% EPDM particles, 10% each for red, green and blue. According to basics of information theory, the colors contain the most information since the largest part of the ground (70%) is black. It should be noted that such a composition of the ground or of the color portions is intended here merely as an example for clarification, and embodiments according to the present invention are not limited to such examples.

According to the basics of information theory, a symbol will carry the most information, the lower its probability of occurrence. Since, in view of the production process, blobs with a very large area, e.g. in the ground surface shown in FIGS. 4 and 5, occur less frequently than blobs with a small area, all blobs with an area that is too small are discarded, for example. This fact does not necessarily apply to all ground which can be used according to the invention. It would be quite possible for this ratio to be exactly reversed for another rubber floor. It is important to understand that the sifting or discarding of blobs, or in other words the selection of sub-features or their associated seeds of sub-extraction information, does not necessarily have to take place on the basis of the observed pixel area, but rather, for example, optimally takes place according to features or extraction information or sub-extraction information associated with the features, which are, for example, unambiguous and improve and/or maximize the information content of the individual elements. An identification of which features or threshold values are suitable can be determined by looking at and/or evaluating the surface, for example of manufacturing processes, or by evaluating already existing grounds.

Figure 6:
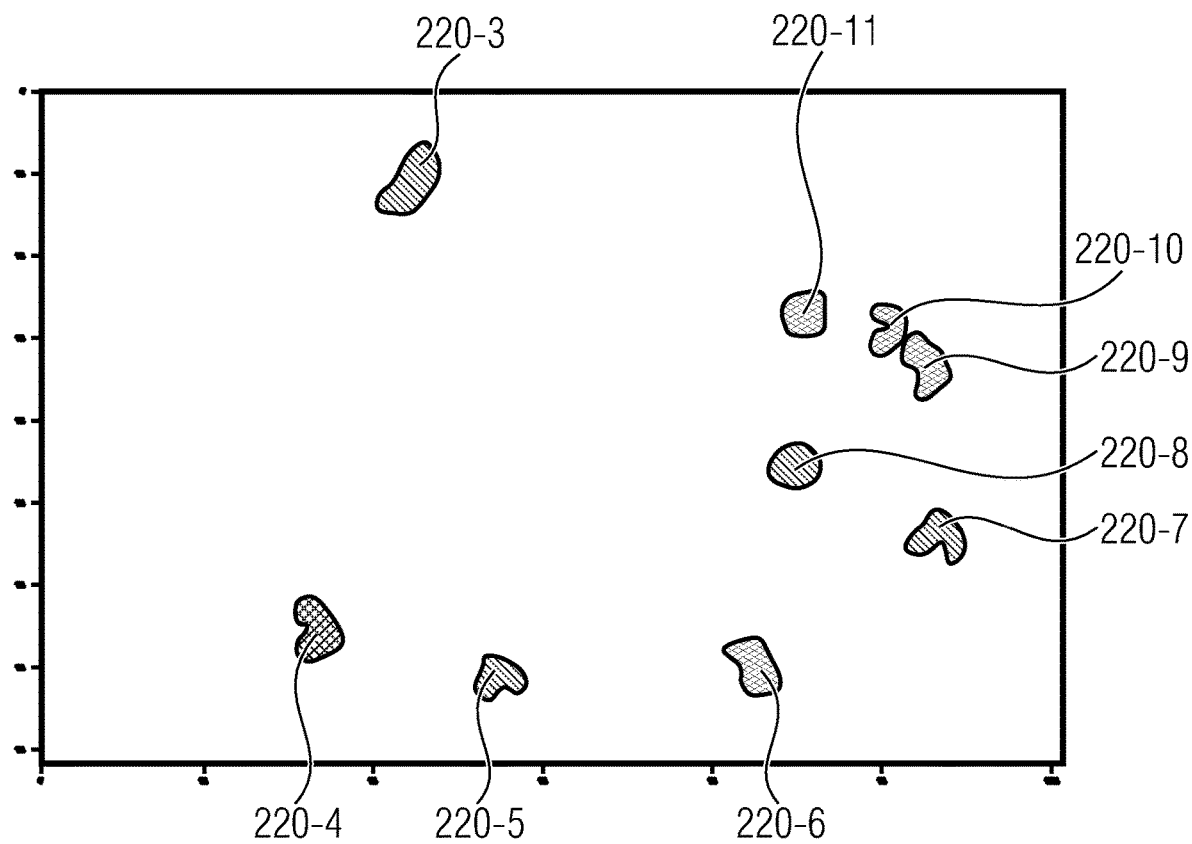
FIG. 6 shows an exemplary representation of a segmentation after discarding blobs with low information content according to an embodiment.

The result of the processing described above can be seen for all three segmentations (R-G-B) in FIG. 6.

FIG. 6 is a representation of the segmentation after discarding the blobs with low information content so that, for example, only features 220-3 to 220-11 remain for evaluating the segment, while others, such as features 220-1 and/or 220-2, are disregarded or filtered out. It should be noted that a combination of features, for example 220-9, 220-10 and 220-11, could also be considered as a combinatorial feature. In other words, FIG. 6 shows features or sub-features from whose associated extraction information or sets of sub-extraction information a value was determined and compared with a threshold value, wherein the determined values of the associated selected blobs have at least fulfilled the threshold value.

Next, a rotation-invariant feature descriptor can be formed for one, several or all blobs, e.g. as part of the extraction information or the sub-extraction information. For this purpose, for example, the so-called Hu moments can be used which, in simplified terms, can represent a mathematical description of the shape of the blob. At this point, other mathematical descriptors may also be used, but the Hu moments can be algorithmically very favorable, since they can be calculated in the course of extracting the color information as a by-product, or in other words, quasi for free, from the segmentation.

For each blob, its position and its Hu moments can now be stored. The next step can again be performed on another abstraction level. A point cloud can be determined from the selected sets of sub-extraction information. Thus, the positions of all blobs of all segmentation levels can be assumed to be one point cloud. Using the camera matrix and the e.g. known distance to the ground, the position of each blob can be converted from pixel coordinates to world coordinates—i.e. the distances of the points in the point cloud formed from the blobs correspond to the e.g. actual or absolute physical distances of the blobs on the ground. By taking into account further optical properties of the detection unit in the form of the camera, further improvements of the extraction information from the scanning information can also be achieved.

The goal now is to fit the observed point cloud of the acquired image to the point cloud resulting from all blobs present in the ground and stored in the database, or in other words previously mapped. See FIG. 7 for this.

Figure 7:
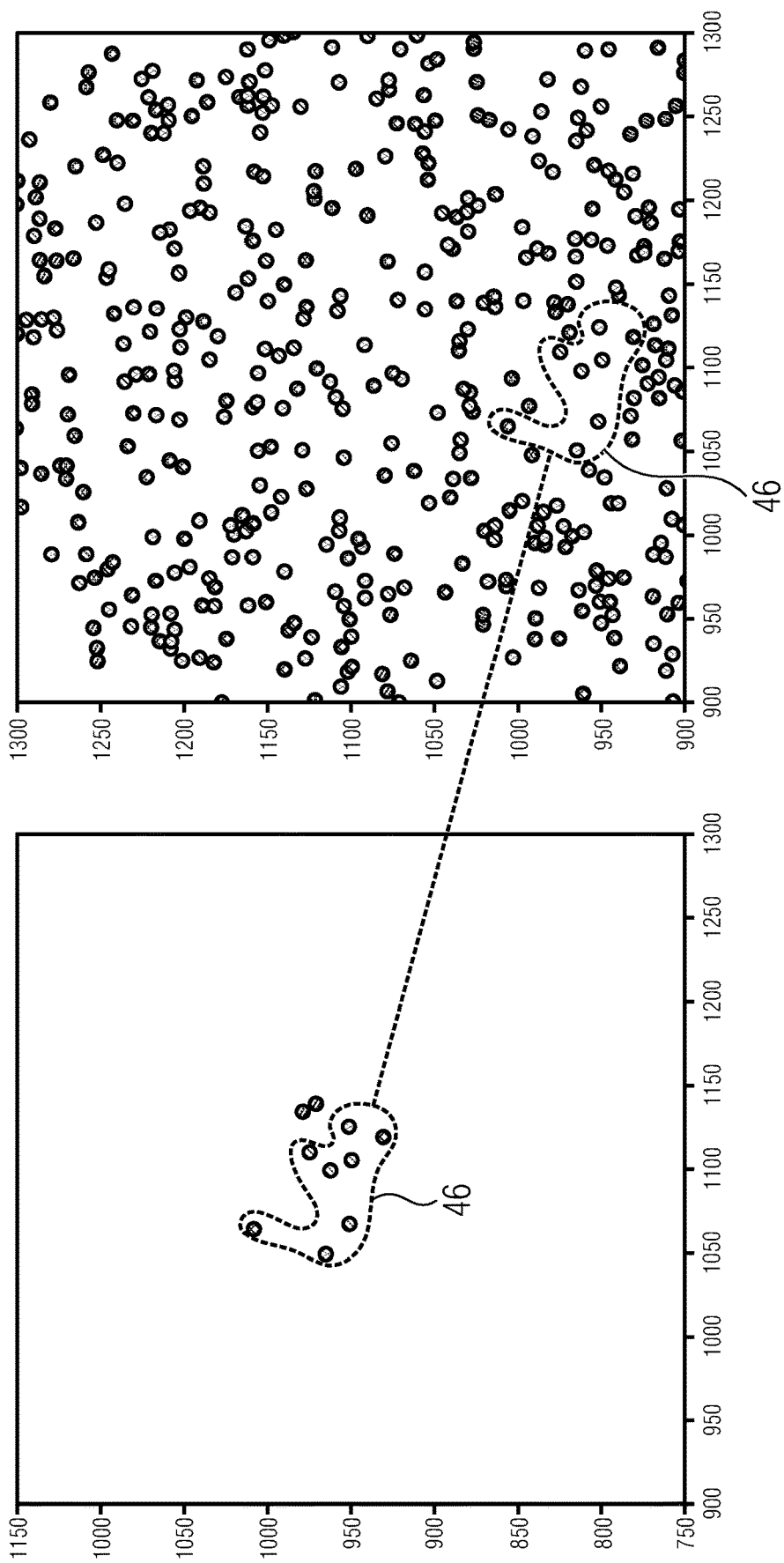
FIG. 7 shows a schematic comparison of an observed point cloud to be referenced, which can be obtained e.g. according to the explanations in FIG. 6, and a reference set of surrounding points.

FIG. 7 shows an observed point cloud to be referenced in a left image section and a reference set of surrounding points in a right image section (right). FIG. 7 on the right may represent a simplified view of a section of the database. A matching grouping 46 of color blobs is exemplary shown.

Fitting can be implemented using a point-cloud matching algorithm, e.g. "Iterative-Closest-Point"—ICP for short. The procedure is not limited to using the iterative closest point algorithm; there are other algorithms such as kernel correlation or RANSAC, which can also be used for fitting point clouds.

At this point, the previously computed descriptors, e.g. feature descriptors, can be used again, since it can be exploited that a point from the observed point cloud can be fitted to a point in the reference cloud, if it a. is located on the same segmentation level (i.e. has the same color)

b. has a small distance according to a metric working on the basis of the feature descriptors (simply put, in terms of Hu moments, has a similar shape).

It should be noted that, for example, especially in further embodiments, further (sub) extraction information can also be used to characterize the (sub) feature and accordingly the matching or, in other words, the fitting can also have further boundary conditions.

Fitting the observed point cloud to the reference data ensures that not only the position of the detection unit, e.g. of the robot in space, but also its rotation or location in space can be determined in one step.

In the following, FIGS. 8, 9, 10 and 11 are used to describe a further embodiment according to the present invention. The embodiment enables an improvement of the position determination by means of stochastic filters and can be used, for example, in particular with a ground camera as a detection unit.

The inventive idea of this embodiment, which can form a further development of previously described inventive concepts, is at first to be explained in general terms.

In localization algorithms of all kinds, false localizations may occur. In the context of present embodiments, it is desirable to minimize such errors for real-world use since, for example, in the specific use case of robots, the robot would otherwise drive very erratically because it thinks for a short time, or in other words the localization briefly feeds back that the robot has jumped to a different position. The minimization can be done via statistical filtering, where the error is modeled as a random variable with a known probability density function.

Figure 8:
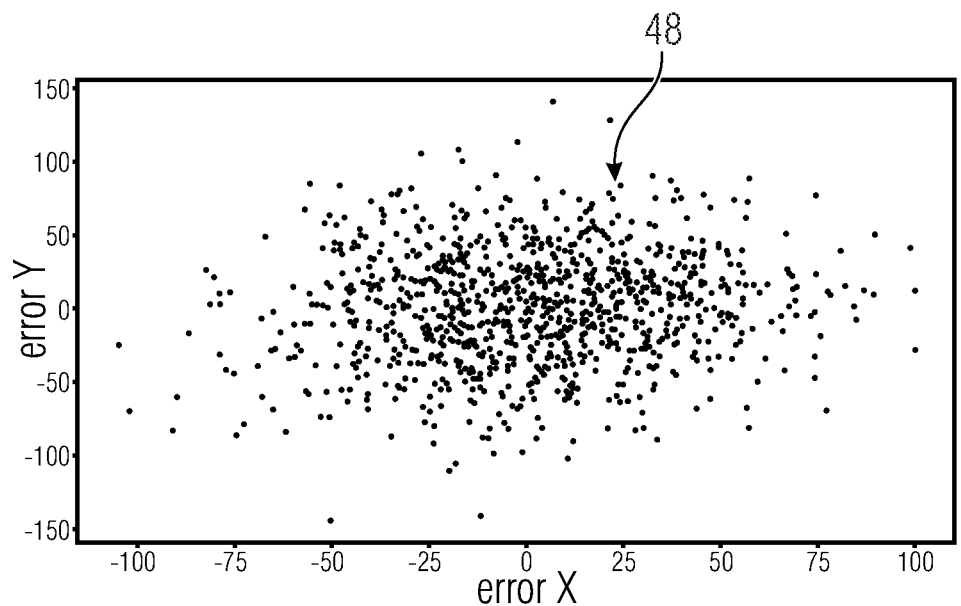
FIG. 8 shows a schematic representation of samples of a normally distributed error of a localization performed according to an embodiment.

The filter can work purely from the data via a statistical model (e.g. in the "Recursive Least Squares" filter) or use additional information from other sensors. In robotics, it has become established to filter the results of the localization algorithm using odometry (e.g. in simple words: "How did I drive") since this data can be easily obtained e.g. by measuring the number of revolutions of the wheel. Again, these measurements may be erroneous, but since the error of the sensor of the number of revolutions of the wheel is usually uncorrelated to the error of the localization algorithm, the two values can be usefully merged to obtain a better estimate of the current position. The two most commonly used filters for this task are the Kalman filter and the particle filter. FIG. 8 is to roughly illustrate the principle.

FIG. 8 shows a schematic representation of samples 48 of a normally distributed error of localization related to errors along two orthogonal directions X and Y.

Basically, a variety of filters can be used, in some cases the type of filter used may not even be important, for example. For a better understanding of why filtering the result can have advantages, or is even important, FIGS. 9, 10 and 11 will be discussed below.

Figure 9:
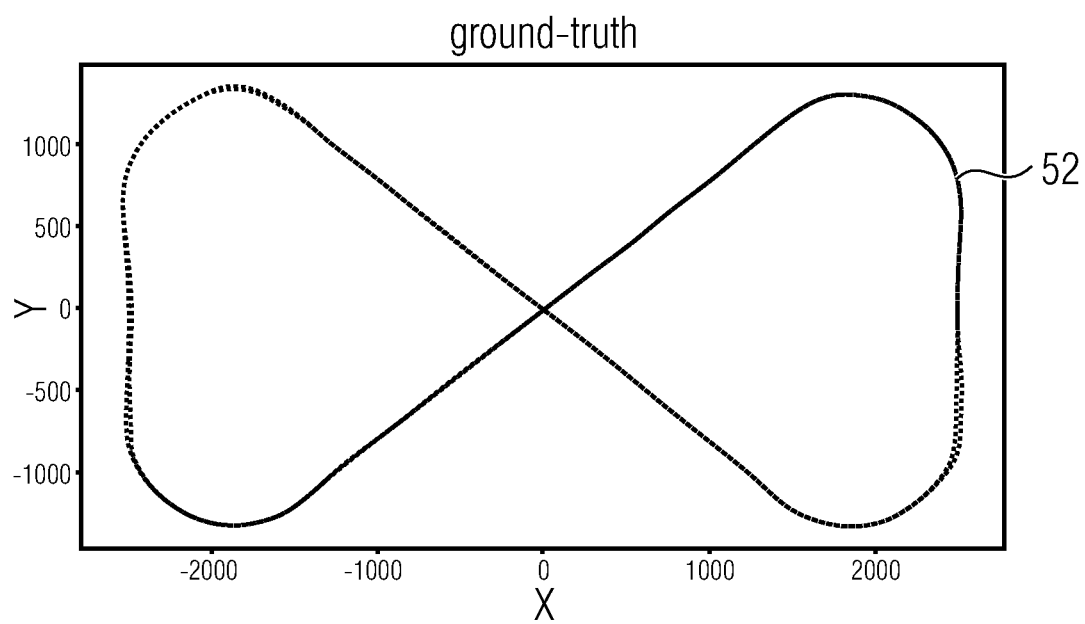
FIG. 9 shows a schematic representation of a trajectory in a plane traversed twice by a robot.

FIG. 9 shows a trajectory 52 of a robot in a plane traversed twice. The single points represent the real position of the vehicle ("ground-truth") in the X-Y plane, measured by a motion capturing system. The graph reflects the trajectory covered (in the form of a transverse hourglass, which was passed twice) without any time component.

Figure 10:
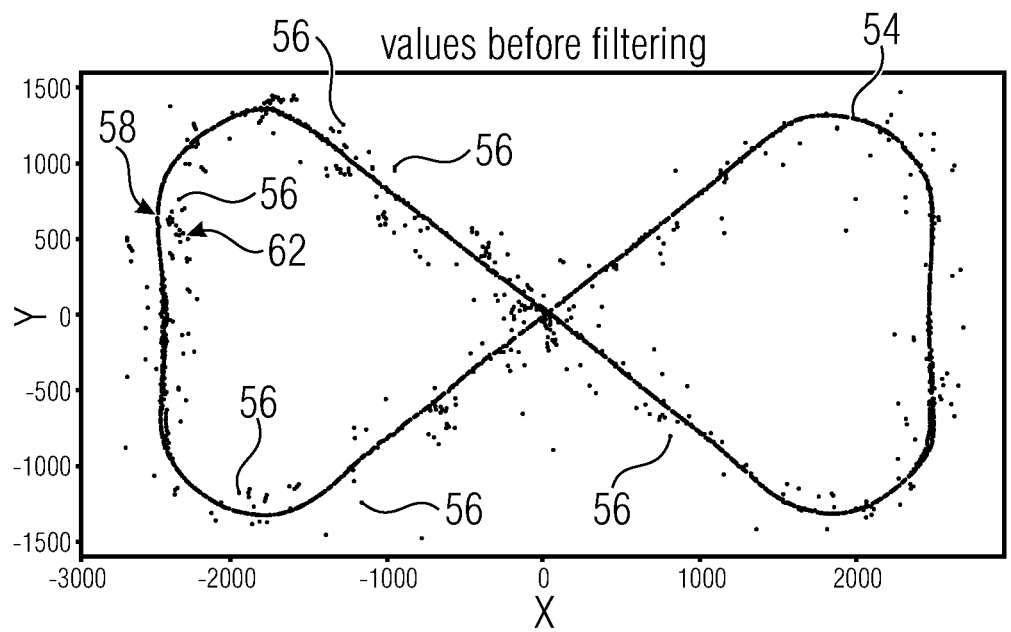
FIG. 10 shows a schematic representation of a result of localization in accordance with embodiments without filtering.

FIG. 10 shows the result of localization without filtering. The results of the localization algorithm are shown. Although one can still clearly see the driven trajectory as a localized trajectory 54, however, false estimations 56 are also clearly visible, which can lead to gaps 58 in and/or outliers 62 on the trajectory 54.

Figure 11:
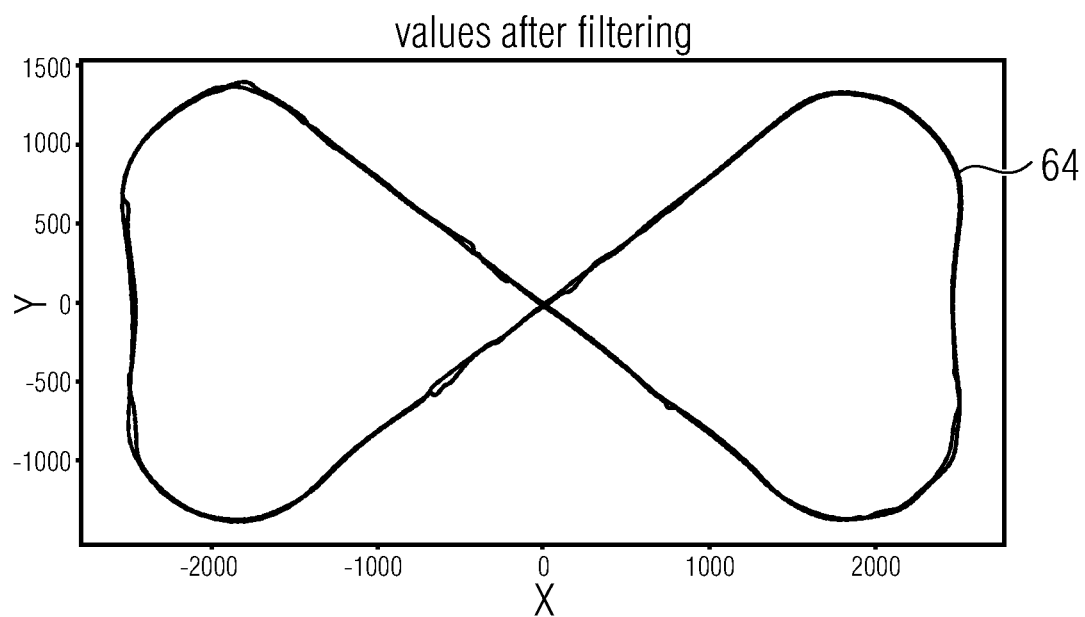
FIG. 11 shows a schematic representation of the result of localization after filtering according to an embodiment.

FIG. 11 shows the localization result after filtering as a filtered trajectory 64 based on filtered individual localizations. The data are not as clean as ground-truth, i.e. there are still deviations, but there are also no real outliers or gaps.

It becomes clear that the use of additional stochastic filters enables an improvement of the localization, e.g. in particular with regard to autonomous navigation tasks. The odometry of a robot according to the invention can also be used for filtering to improve the position information. This can also be used to create particularly safety-critical, e.g. redundant systems, e.g. to reduce the probability of false localizations and accidents.

CONCLUSIONS AND FURTHER REMARKS

In general, embodiments according to the present invention have the advantage that inventive methods can still function accurately without great expense at very high speeds, e.g. a robot which has the detection unit (a current prototype manages 5 m/s, for example). This may be one of the most important advantages. Among other things, this is also due to the fact that the calculation times of the algorithms used are very short, which is another advantage of inventive apparatus.

Image segmentation and computation of feature descriptors in embodiments of the present invention can be computed in a highly parallelized manner, e.g. on a graphics card, and the algorithms for point-cloud matching can also be executed with low computational complexity (example of an order of magnitude of computational complexity: an exemplary prototype achieves 50 localizations per second on an Nvidia® Jetson board). In other words, algorithms for point-cloud matching can be little computationally intensive.

Ground-based localization according to the invention generally has the advantage (e.g. before or with respect to localizations based on the environment) that it works robustly, even in changing environments, such as an automated warehouse.

A major advantage or the greatest advantage over existing solutions can be that the inventive method (as already mentioned above) still functions reliably at high speeds.

Another advantage of inventive concepts, e.g. compared to marker-based approaches, is that markers, e.g. QR codes, are not applied to the ground at first and do not have to be renewed if they become too worn. In addition, examples of such systems do not provide "gapless" localization because no recognition is possible between markers, e.g. QR codes. In contrast, an inventive method enables e.g. gapless localization with features already applied automatically in the manufacturing process of the surface, e.g. of the floor.

In general, embodiments according to the present invention are based on the concept of segmenting color speckles, e.g. blobs in the ground, using descriptors, e.g. feature descriptors for the color speckles, using a point-cloud matching algorithm, and considering previously extracted extraction information or sub-extraction information, e.g. previously extracted features, in matching or fitting.

Further embodiments may be based on segmentation of red, green, and blue speckles, segmentation of speckles in rubber floors, use of Hu moments as feature descriptors, use of ICP as a point-cloud matching algorithm, and consideration of Hu moments in ICP matching. Furthermore, ORB features with kernel correlation can be used instead of Hu moments with ICP, for example.

In general, embodiments according to the present invention can be used technically for basically any form of mobile robots used in industry. The previously described rubber floors are, for example, as already mentioned, absolute standard in many applications and can be used perfectly, for example, as a floor in an industrial hall. However, especially because of the ability to localize at very high speeds, for example, compared to the known technology, the described inventive approach is particularly suitable, for example, for fast moving mobile robots, which can be used, for example, in vehicle-based sorting systems or are relevant for transports over longer distances.

Embodiments according to the present disclosure can be converted into an SLAM method or, in other words, be used for an SLAM method. The great advantage with SLAM, for example, is that a changing environment can be dealt with. Let's take a room containing a table with chairs as an example. The position of the chairs can change over time.

SLAM methods re-map the new position of the chairs and keep it as a reference until changed again.

An advantage of inventive methods compared to SLAM methods, however, is that inherent features of the ground surface are used as a reference, e.g. the speckle pattern created during the production of the rubber floor, so that according to the invention there is no need for the permanent remapping process, since the changes on the ground are rather small and can be carried out in a process separate from the localization, possibly even by another apparatus/vehicle (e.g. to react to signs of wear, which may occur after several years).

Embodiments according to the present invention comprise an apparatus for determining the position of a detection unit, which forms an internal localization system.

A method for determining a position of a detection unit according to an embodiment comprises the following steps:
  obtaining scanning information from the detection unit, wherein the scanning information are a scan of a surface, and wherein the scanning information include information on an inherent feature of the surface; and
  extracting extraction information for the inherent feature from the scanning information; and
  performing matching, based on the extraction information, with a database, wherein the database stores extraction information for a plurality of inherent features of the surface; and
  determining the position of the detection unit based on the matching.

A method for storing extraction information in a database for use with an apparatus according to embodiments described herein comprises the following steps:
  obtaining scanning information, wherein the scanning information are a scan of a surface, and wherein the scanning information include information on an inherent feature of the surface; and
  extracting extraction information for the inherent feature from the scanning information; and
  storing the extraction information for the inherent feature of the surface in the database.

Such a method optionally further comprises:
  determining a value associated with an information content of the inherent feature; and
  comparing the value to a threshold value; and
  storing the extraction information for the inherent feature of the surface in the database, provided that the determined value of the inherent feature at least reaches the threshold value.

All the listed materials, environmental influences, electrical properties and optical properties re to be regarded as examples and not exhaustive.

Although some aspects have been described in the context of an apparatus, it is understood that these aspects also represent a description of the corresponding method so that a block or component of an apparatus is also to be understood to be a corresponding method step or a feature of a method step. In analogy, aspects described in connection with or as a method step also represent a description of a corresponding block or detail or feature of a corresponding apparatus. Some or all of the method steps may be performed by (or using) a hardware apparatus, such as a microprocessor, a programmable computer, or an electronic circuit. In some embodiments, some or more of the most important method steps may be performed by such an apparatus.

Depending on particular implementation requirements, embodiments of the invention may be implemented in hardware or in software. The implementation may be performed using a digital storage medium, for example a floppy disk, a DVD, Blu-ray disc, CD, ROM, PROM, EPROM, EEPROM, FLASH memory, a hard disk, or any other magnetic or optical storage medium on which electronically readable control signals are stored which are able to interact or interact with a programmable computer system so as to perform the respective method. Therefore, the digital storage medium may be computer-readable.

Thus, some embodiments according to the invention include a data carrier having electronically readable control signals capable of interacting with a programmable computer system such that any of the methods described herein are performed.

Generally, embodiments of the present invention may be implemented as a computer program product having program code, the program code being operative to perform any of the methods when the computer program product runs on a computer.

For example, the program code may also be stored on a machine-readable medium.

Other embodiments include the computer program for performing any of the methods described herein, wherein the computer program is stored on a machine-readable medium.

In other words, an embodiment of the inventive method is thus a computer program comprising program code for performing any of the methods described herein when the computer program runs on a computer.

Thus, another embodiment of the inventive methods is a data carrier (or digital storage medium or computer-readable medium) on which the computer program for performing any of the methods described herein is recorded. The data carrier, digital storage medium or computer-readable medium is typically tangible and/or non-transitory or non-transient.

Thus, a further embodiment of the inventive method is a data stream or sequence of signals representing the computer program for performing any of the methods described herein. The data stream or sequence of signals may, for example, be configured to be transferred via a data communication link, for example via the Internet.

Another embodiment comprises a processing device, such as a computer or programmable logic device, configured or adapted to perform any of the methods described herein.

Another embodiment includes a computer having installed thereon the computer program for performing any of the methods described herein.

Another embodiment according to the invention comprises an apparatus or system configured to transmit a computer program for performing at least one of the methods described herein to a receiver. The transmission may be, for example, electronic or optical. The receiver may be, for example, a computer, mobile device, storage device, or similar device. The apparatus or system may include, for example, a file server for transmitting the computer program to the receiver.

In some embodiments, a programmable logic device (for example, a field-programmable gate array, FPGA) may be used to perform some or all of the functionalities of the methods described herein. In some embodiments, a field-programmable gate array may interact with a microprocessor to perform any of the methods described herein. In general, in some embodiments, the methods are performed on the part of any hardware apparatus. This may be general-purpose hardware such as a computer processor (CPU), or hardware specific to the method, such as an ASIC.

The apparatus described herein may be implemented using, for example, a hardware apparatus, or using a computer, or using a combination of a hardware apparatus and a computer.

The apparatus described herein, or any components of the apparatus described herein, may be implemented at least partly in hardware and/or in software (computer program).

The methods described herein may, for example, be implemented using a hardware apparatus, or using a computer, or using a combination of a hardware apparatus and a computer.

The methods described herein, or any components of the methods described herein, may be performed at least partly by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus comprising:
   a processing unit configured to
      acquire scanning information, provided by a detection unit, from a scan of a surface, the scanning information comprising information on an inherent feature of the surface, wherein the inherent feature of the surface comprises a plurality of sub-features; and
      extract extraction information for the inherent feature from the scanning information, wherein the processing unit is configured to extract a set of sub-extraction information for each sub-feature of the plurality of sub-features and to determine a descriptor as part of the set of sub-extraction information for each sub-feature; and
      determine a value from each set of sub-extraction information, the value being associated to an information content of the sub-feature associated with the set of sub-extraction information; and
      compare each value to a threshold value; and
      select those sets of sub-extraction information for whose associated sub-feature the determined value at least reaches the threshold value; and
      perform matching with a database based on determined descriptors of the selected sets of sub-extraction information, wherein the database stores extraction information for a plurality of inherent features of the surface whose positions are known, and wherein the database stored descriptors for the plurality of sub-features; and
      determine the position of the detection unit based on the matching.

2. The apparatus according to claim 1, the apparatus comprising the detection unit configured to provide the scanning information.

3. The apparatus according to claim 1, wherein the processing unit is configured to determine, based on the matching with the database, the location of the detection unit in space with respect to the inherent feature of the surface.

4. The apparatus according to claim 1, wherein the processing unit is configured to extract the extraction information for the inherent feature from the scanning information taking into account optical properties of the detection unit.

5. The apparatus according to claim 1, wherein the processing unit is configured to select a selected part of extraction information of the database based on coarse information on the position of the detection unit in space, at the time of detecting the scanning information, and to use the selected part for matching.

6. The apparatus according to claim 1, wherein the processing unit is configured to determine a rotation-invariant descriptor as part of the extraction information which is based on the inherent feature of the surface.

7. The apparatus according to claim 1, wherein the inherent feature of the surface is a stochastically distributed feature comprising stochastic properties.

8. The apparatus according to claim 7, wherein the information specifies a description of a random geometry of the stochastically distributed feature.

9. The apparatus according to claim 7, wherein the stochastically distributed feature comprises a contiguous surface comprising random area and random external shape; and
   wherein the processing unit is configured to extract the extraction information comprising information on the contiguous area comprising random area and random external shape.

10. The apparatus according to claim 1, wherein the processing unit comprises a stochastic filter, and wherein the processing unit is configured to perform filtering of the determined position of the detection unit by means of the stochastic filter to determine a filtered position of the detection unit.

11. The apparatus according to claim 1, wherein the processing unit is configured to select the sets of sub-extraction information based on the probability of occurrence of the associated sub-features.

12. The apparatus according to claim 1, wherein the processing unit is configured to determine from each set of sub-extraction information a probability of occurrence of the associated sub-feature as a value for the information content.

13. The apparatus according to claim 1, wherein the processing unit is configured to determine a point cloud from the selected sets of sub-extraction information and to perform matching with the database based on a point cloud matching algorithm.

14. The apparatus according to claim 1, wherein the processing unit is configured to
   acquire the scanning information as an image from a camera as a detection unit, wherein the image is a scan of a ground surface, and wherein the image comprises information on an image background and an image foreground, the image foreground comprising information on a plurality of color speckles of the ground; and
   extract the information on the image foreground from the image; and
   for each color speckle of the plurality of color speckles, extract a set of sub-extraction information from the extracted information of the image foreground and determine a descriptor as part of the set of sub-extraction information, the set of sub-extraction information comprising information on a position and at least one of a shape, a color and an area parameter of the associated color speckle; and
   determine a value from each set of sub-extraction information, the value being associated to a probability of occurrence of the color speckle associated to the set of sub-extraction information; and compare each value to a threshold value; and select those sets of sub-extraction information for whose associated color speckle the determined value at least reaches the threshold value; and determine a point cloud from the selected sets of sub-extraction information which comprise information on the positions of the associated color speckles; and perform matching with a database based on the point cloud and the selected sets of sub-extraction information, wherein the database stores a predetermined point cloud of positions of color speckles of the ground surface and corresponding sets of sub-extraction information, and wherein the database stores descriptors for the plurality of color speckles; and determine the position of the camera based on the matching.

15. The apparatus according to claim 1, the apparatus being an automatically moving vehicle, and wherein the processing unit is configured to locate the automatically moving vehicle.

16. The apparatus according to claim 1,
wherein the inherent feature comprises an optically recognizable, distinguishable or varying over the surface feature in the form of a difference in contrast, a difference in color and/or a height profile of the surface.

17. The apparatus according to claim 1,
wherein the inherent feature of the surface is a difference in contrast, a difference in color and/or a height profile of the surface.

18. The apparatus according to claim 1,
wherein the inherent feature of the surface is a stochastically distributed feature with stochastic properties;
wherein the feature is a pattern of the surface with different sizes, shapes, colors or structures and/or a height profile.

19. A system comprising:
an apparatus according to claim 1; and
the surface comprising the inherent feature, the apparatus being arranged to be movable with respect to the surface and configured to determine a position of the detection unit with respect to the surface; and
the database.

20. A method for storing extraction information in a database for use with an apparatus according to claim 1, comprising:
acquiring scanning information, wherein the scanning information are a scan of a surface, and wherein the scanning information comprise information on an inherent feature of the surface, wherein the inherent feature of the surface comprises a plurality of sub-features; and
extracting extraction information for the inherent feature from the scanning information, wherein extracting the extraction information comprises, for each sub-feature of the plurality of sub-features, extracting a set of sub-extraction information and determining a descriptor for each sub-feature as part of the set of sub-extraction information; and
determining a value from each set of sub-extraction information, wherein the value is associated with an information content of the sub-feature associated to the set of sub-extraction information; and comparing the value to a threshold value; and
storing the extraction information for the inherent feature of the surface in the database, provided that the determined value of the inherent sub-feature at least reaches the threshold value.

21. A non-transitory digital storage medium having stored thereon a computer program for performing a method for storing extraction information in a database for use with an apparatus according to claim 1, comprising:
acquiring scanning information, wherein the scanning information are a scan of a surface, and wherein the scanning information comprise information on an inherent feature of the surface, wherein the inherent feature of the surface comprises a plurality of sub-features; and
extracting extraction information for the inherent feature from the scanning information, wherein extracting the extraction information comprises, for each sub-feature of the plurality of sub-features, extracting a set of sub-extraction information and determining a descriptor for each sub-feature as part of the set of sub-extraction information; and
determining a value from each set of sub-extraction information, wherein the value is associated with an information content of the sub-feature associated to the set of sub-extraction information; and
comparing the value to a threshold value; and
storing the extraction information for the inherent feature of the surface in the database, provided that the determined value of the inherent sub-feature at least reaches the threshold value,
when said computer program is run by a computer.

22. A method for determining a position of a detection unit, comprising:
acquiring scanning information from the detection unit, wherein the scanning information are a scan of a surface, and wherein the scanning information comprise information on an inherent feature of the surface, wherein the inherent feature of the surface comprises a plurality of sub-features; and
extracting extraction information for the inherent feature from the scanning information;
wherein extracting the extraction information further comprises, for each sub-feature of the plurality of sub-features, extracting a set of sub-extraction information and determining a descriptor for each sub-feature as part of the set of sub-extraction information; and
determining a value from each set of sub-extraction information, the value being associated to an information content of the sub-feature associated with the set of sub-extraction information; and
comparing each value to a threshold value; and
selecting those sets of sub-extraction information whose associated sub-feature at least reaches the determined value of the threshold value; and
performing matching, based on the determined descriptors of the selected sets of sub-extraction information, with a database, wherein the database stores descriptors for the plurality of sub-features of extraction information for a plurality of inherent features of the surface whose positions are known; and
determining the position of the detection unit based on the matching.

23. A non-transitory digital storage medium having stored thereon a computer program for performing a method for determining a position of a detection unit, comprising:

acquiring scanning information from the detection unit, wherein the scanning information are a scan of a surface, and wherein the scanning information comprise information on an inherent feature of the surface, wherein the inherent feature of the surface comprises a plurality of sub-features; and extracting extraction information for the inherent feature from the scanning information;

wherein extracting the extraction information further comprises, for each sub-feature of the plurality of sub-features, extracting a set of sub-extraction information and determining a descriptor for each sub-feature as part of the set of sub-extraction information; and determining a value from each set of sub-extraction information, the value being associated to an information content of the sub-feature associated with the set of sub-extraction information; and comparing each value to a threshold value; and selecting those sets of sub-extraction information whose associated sub-feature at least reaches the determined value of the threshold value; and performing matching, based on the determined descriptors of the selected sets of sub-extraction information, with a database, wherein the database stores descriptors for the plurality of sub-features of extraction information for a plurality of inherent features of the surface whose positions are known; and determining the position of the detection unit based on the matching, when said computer program is run by a computer.

* * * * *